United States Patent
Deng et al.

(10) Patent No.: US 12,415,474 B1
(45) Date of Patent: Sep. 16, 2025

(54) MANIFOLD TO SELECTIVELY INFLATE SEAT AIRBAGS

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/607,628

(22) Filed: Mar. 18, 2024

(51) Int. Cl.
*B60R 21/01* (2006.01)
*B60R 21/0134* (2006.01)
(Continued)

(52) U.S. Cl.
CPC ........ *B60R 21/261* (2013.01); *B60R 21/0134* (2013.01); *B60R 21/207* (2013.01);
(Continued)

(58) Field of Classification Search
CPC ... B60R 21/01; B60R 21/013; B60R 21/0134; B60R 21/16; B60R 21/20; B60R 21/207; B60R 21/26; B60R 21/261; B60R 21/23; B60R 21/231; B60R 21/23138; B60R 21/276; B60R 2021/01204; B60R 2021/01211; B60R 2021/2612; B60R 2021/2615; B60R 2021/26094; B60R 2021/23107; B60R 2021/23146

See application file for complete search history.

(56) References Cited

U.S. PATENT DOCUMENTS 5,947,514 A * 9/1999 Keller ................... B60R 21/207
280/736
7,677,598 B1 3/2010 Ryan et al.
(Continued)

FOREIGN PATENT DOCUMENTS

CN 101092126 B * 7/2013 ........... B60R 21/233
CN 106585547 B * 1/2019
(Continued)

OTHER PUBLICATIONS

Description Translation for CN 115379969 from Espacenet (Year: 2022).*
(Continued)

*Primary Examiner* — Jason D Shanske
*Assistant Examiner* — Daniel M. Keck
(74) *Attorney, Agent, or Firm* — Frank A. MacKenzie; Brooks Kushman P.C.

(57) ABSTRACT

An assembly includes a seat. The assembly includes a first airbag supported by the seat. The assembly includes a second airbag supported by the seat. The assembly includes a manifold defining a chamber. The manifold includes a first fluid outlet operatively coupled to the first airbag to provide fluid from the chamber to the first airbag. The manifold includes a second fluid outlet operatively coupled to the second airbag to provide fluid from the chamber to the second airbag. The manifold includes an exhaust fluid outlet. The assembly includes an inflator operatively coupled to the manifold to provide fluid to the chamber.

19 Claims, 5 Drawing Sheets

(51) Int. Cl.
*B60R 21/207* (2006.01)
*B60R 21/231* (2011.01)
*B60R 21/26* (2011.01)
*B60R 21/261* (2011.01)

(52) U.S. Cl.
CPC .............. *B60R 2021/01211* (2013.01); *B60R 2021/23107* (2013.01); *B60R 2021/26094* (2013.01); *B60R 2021/2615* (2013.01)

(56) References Cited

U.S. PATENT DOCUMENTS

| | | | | |
|---|---|---|---|---|
| 10,899,303 | B2* | 1/2021 | Nagasawa | ................ B60N 2/75 |
| 11,161,473 | B2 | 11/2021 | Deng et al. | |
| 11,267,427 | B1 | 3/2022 | Deng et al. | |
| 11,479,200 | B1 | 10/2022 | Gao et al. | |
| 2004/0232675 | A1* | 11/2004 | Marotzke | .............. B60R 21/276 280/739 |
| 2011/0298201 | A1* | 12/2011 | Kobayashi | ........ B60R 21/23138 280/736 |
| 2015/0183393 | A1* | 7/2015 | Kino | ..................... B60R 21/237 280/729 |
| 2016/0221528 | A1* | 8/2016 | Sugimura | ............. B60R 21/207 |
| 2019/0176739 | A1* | 6/2019 | Song | .................. B60R 21/2338 |
| 2022/0314918 | A1* | 10/2022 | Muralidharan | ....... B60N 2/4279 |
| 2022/0324405 | A1* | 10/2022 | Abramczyk | ....... B60R 21/01554 |

FOREIGN PATENT DOCUMENTS

| | | | | |
|---|---|---|---|---|
| CN | 113511166 | A | * 10/2021 | |
| CN | 115379969 | A | * 11/2022 | ....... B60R 21/23138 |
| DE | 102005035753 | A1 | 5/2006 | ....... B60R 21/23138 |
| DE | 102017100237 | A1 | * 7/2017 | ............... B60N 2/75 |
| DE | 102019123622 | A1 | * 3/2021 | ............. B60N 2/143 |
| JP | 2008201298 | A | 9/2008 | |
| JP | 2010228623 | A | * 10/2010 | ....... B60R 21/23138 |
| KR | 20070039775 | A | 4/2007 | |
| WO | WO-2004067333 | A1 | * 8/2004 | ....... B60R 21/23138 |
| WO | WO-2024095697 | A1 | * 5/2024 | |

OTHER PUBLICATIONS

Description Translation for JP 2010228623 from Espacenet (Year: 2010).*

\* cited by examiner

MANIFOLD TO SELECTIVELY INFLATE SEAT AIRBAGS

BACKGROUND

A vehicle may include one or more airbags deployable during certain vehicle impacts to control kinematics of occupants inside the vehicle. The airbag may be a component of an airbag assembly including a housing supporting the airbag, and an inflator in communication with the airbag for inflating the airbag from an uninflated position to an inflated position.

DETAILED DESCRIPTION

Figure 1:
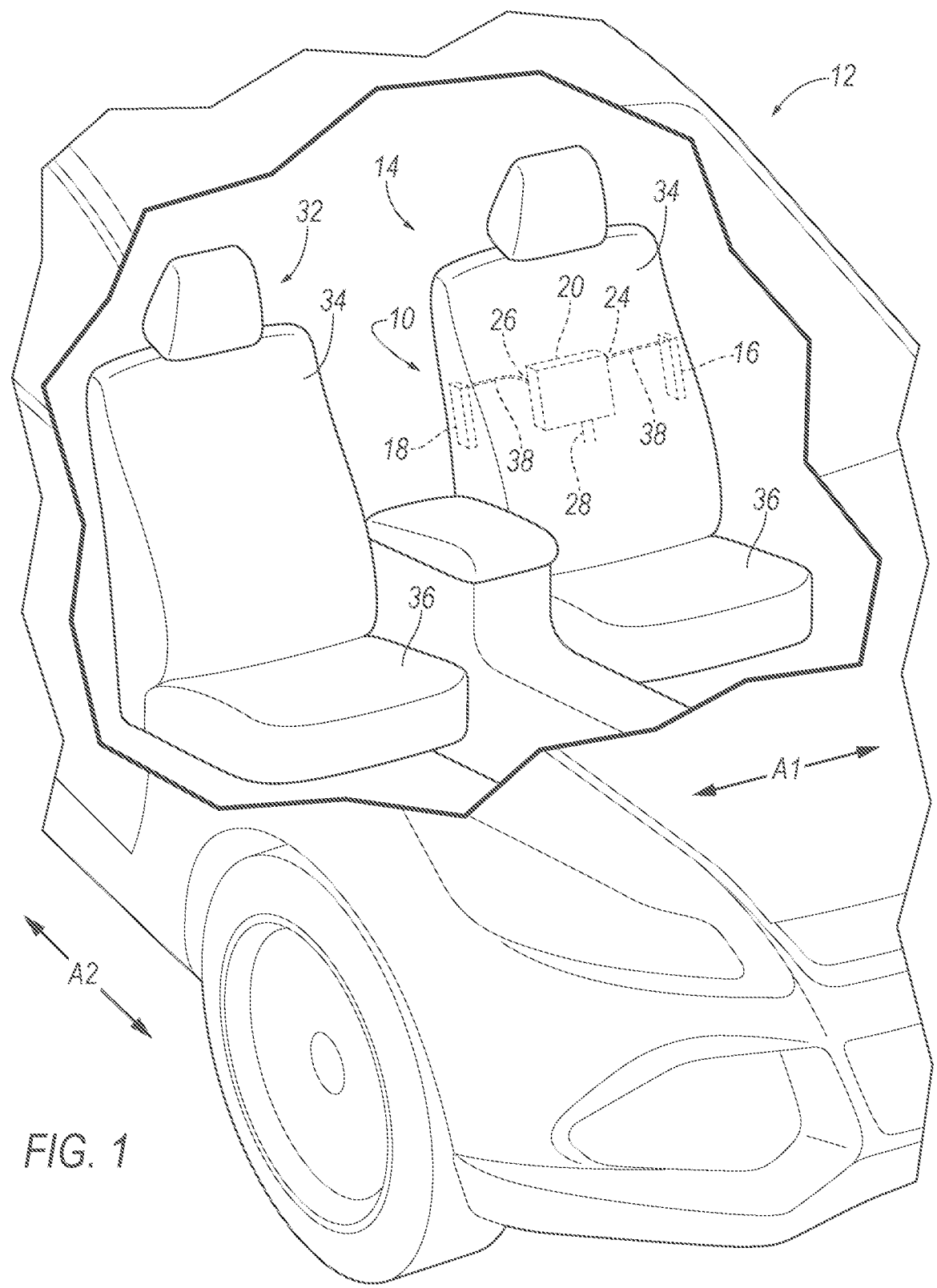
FIG. 1 is a perspective view of a portion of a vehicle broken away to show a passenger cabin with airbags at uninflated positions.

An assembly includes a seat. The assembly includes a first airbag supported by the seat. The assembly includes a second airbag supported by the seat. The assembly includes a manifold defining a chamber. The manifold includes a first fluid outlet operatively coupled to the first airbag to provide fluid from the chamber the first airbag. The manifold includes a second fluid outlet operatively coupled to the second airbag to provide fluid from the chamber to the second airbag. The manifold includes an exhaust fluid outlet. The assembly includes an inflator operatively coupled to the manifold to provide fluid to the chamber.

The assembly may include an exhaust valve movable to an open position permitting fluid flow through the exhaust fluid outlet and to a closed position inhibiting fluid flow through the exhaust fluid outlet.

The assembly may include a first valve movable to an open position permitting fluid flow through the first fluid outlet and to a closed position inhibiting fluid flow through the first fluid outlet, and a second valve movable to an open position permitting fluid flow through the second fluid outlet and to a closed position inhibiting fluid flow through the second fluid outlet.

The assembly may include a computer having a processor and memory storing instructions executable by the processor to, in response to detecting a certain impact, command the first valve from a closed position to an open position and command actuation of the inflator.

The instructions may include instructions to command the first valve from the open position to the closed position after commanding the first valve from the closed position to the open position.

The instructions may include instructions to command the exhaust valve from a closed position to an open position concurrent with or after commanding the first valve from the open position to the closed position.

The instructions may include instructions to determine whether an occupant of the seat is above a size threshold. The instructions may include instructions to, in response to determining the occupant of the seat is not above the size threshold, command the first valve from the open position to the closed position a first amount of time after commanding the first valve from the closed position to the open position. The instructions may include instructions to, in response to determining the occupant of the seat is above the size threshold, command the first valve from the open position to the closed position a second amount of time after commanding the first valve from the closed position to the open position, the second amount of time being greater than the first amount of time.

The instructions may include instructions to command the exhaust valve from a closed position to an open position concurrent with, or after, commanding the first valve from the open position to the closed position.

The assembly of claim may include a second seat, and the instructions may include instructions to, in response to both determining the second seat is occupied and detecting the certain impact, command the second valve from a closed position to an open position.

The instructions may include instructions to command the second valve from the closed position to the open position a threshold amount of time after commanding the first valve from the closed position to the open position.

The threshold amount of time may be 20-50 milliseconds.

The instructions may include instructions to command the first valve from the open position to the closed position after commanding the first valve from the closed position to the open position, and to command the second valve from the open position to the closed position after commanding the second valve from the closed position to the open position.

The instructions may include instructions to command the exhaust valve from a closed position to an open position concurrent with or after commanding the second valve from the open position to the closed position.

The instructions may include instructions to determine whether an occupant of the seat is above a size threshold. The instructions may include instructions to, in response to determining the occupant of the seat is not above the size threshold, command the first valve from the open position to the closed position a first amount of time after commanding the first valve from the closed position to the open position. The instructions may include instructions to, in response to determining the occupant of the seat is above the size threshold, command the first valve from the open position to the closed position a second amount of time after commanding the first valve from the closed position to the open position, the second amount of time being greater than the first amount of time. The instructions may include instructions to command the second valve from the open position to the closed position.

The instructions may include instructions to command the exhaust valve from a closed position to an open position concurrent with or after commanding the second valve from the open position to the closed position.

The chamber may define a first cross-sectional area and the first fluid outlet may define a second cross-sectional area that is less than the first cross-sectional area.

The manifold and the inflator may be supported by the seat.

With reference to the Figures, wherein like numerals indicate like parts throughout the several views, an assembly 10 for controlling kinematics of an occupant of a vehicle 12 is shown. The assembly 10 includes a seat 14. The assembly 10 includes a first airbag 16 supported by the seat 14. The assembly 10 includes a second airbag 18 supported by the seat 14. The assembly 10 includes a manifold 20 defining a chamber 22. The manifold 20 includes a first fluid outlet 24 operatively coupled to the first airbag 16 to provide fluid from the chamber 22 the first airbag 16. The manifold 20 includes a second fluid outlet 26 operatively coupled to the second airbag 18 to provide fluid from the chamber 22 to the second airbag 18. The manifold 20 includes an exhaust fluid outlet 28. The assembly 10 includes an inflator 30 operatively coupled to the manifold 20 to provide fluid to the chamber 22. The manifold 20 may temporarily store inflation medium for inflating the first airbag 16 and the second airbag 18 to provide increased control of inflation dynamics of the first airbag 16 and the second airbag 18, e.g., control of inflation timing and airbag inflation pressure. The exhaust fluid outlet 28 permits excess inflation medium to be purged from the manifold 20, e.g., after inflation of the first airbag 16 and/or the second airbag 18.

Figure 2:
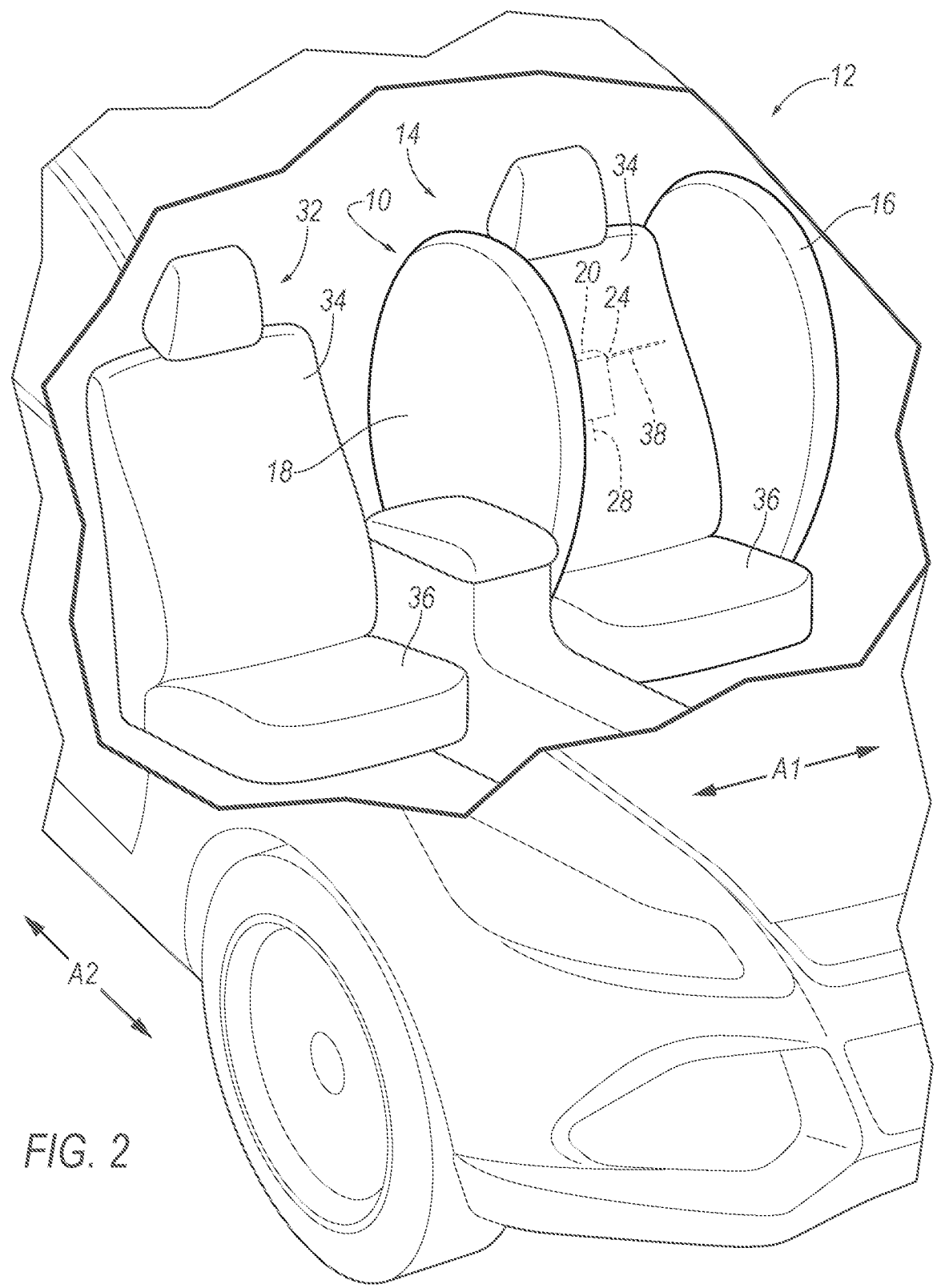
FIG. 2 is a perspective view of the portion of the vehicle broken away to show the passenger cabin the airbags at inflated positions.

With reference to FIGS. 1 and 2, the vehicle 12 may be any suitable type of automobile, e.g., a passenger or commercial automobile such as a sedan, a coupe, a truck, a sport utility vehicle, a crossover vehicle, a van, a minivan, a taxi, a bus, etc.

In the present description, relative vehicular orientations and directions (by way of example, top, bottom, front, rear, outboard, inboard, inward, outward, forward, rearward, lateral, left, right, etc.) are from the perspective of an occupant seated in the vehicle 12 and facing forward, e.g., toward a forward windshield of the vehicle 12. The forward direction of the vehicle 12 is the direction of movement of the vehicle 12 when the vehicle 12 is engaged in forward drive with wheels of the vehicle straight.

The vehicle 12 defines a lateral axis A1 extending between a left-side and a right-side of the vehicle 12. The vehicle 12 defines a longitudinal axis A2 extending between a front and a rear of the vehicle 12. The vehicle 12 defines a vertical axis extending between a top and a bottom of the vehicle 12. The lateral axis A1, the longitudinal axis A2, and the vertical axis are perpendicular relative to each other.

The vehicle 12 includes a frame and a body. The body may be of unitary construction, in which the frame is unitary with the body, e.g., including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc. The body defines the passenger cabin to house occupants, if any, of the vehicle 12. The passenger cabin may extend across the vehicle 12, i.e., from one side to the other side of the vehicle 12. The passenger cabin includes the front end and a rear end.

One or more seats 14, 32, e.g., the seat 14 and a second seat 32, may be supported in the passenger cabin, e.g., by the floor of the vehicle 12. The seat 14 and the second seat 32 may be spaced arranged along the lateral axis A1, e.g., as right and left seats 14, 32. Each seat 14 includes a seatback 34 and a seat bottom 36 that can support an occupant of the seat 14. For example, the occupant of the seat 14 may sit atop a top surface of the seat bottom 36 and recline against the seatback 34. The seatback 34 and the seat bottom 36 4 may be adjustable in multiple degrees of freedom. Specifically, the seatback 34 and the seat bottom 36 may themselves be adjustable, in other words, adjustable components within the seatback 34 and/or the seat bottom 36.

The seatback 34 can include a frame and a covering. The frame may include tubes, beams, etc. Specifically, the frame may include a pair of upright frame members. The upright frame members are elongated, and specifically, are elongated in a generally upright direction (e.g., generally along a vertical axis) when the seatback 34 is in a generally upright position. The upright frame members are spaced from each other along the lateral axis A1. The frame may include one or more cross-members extending between the upright frame members. The frame, including the upright frame members, may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The cover may include upholstery and padding. The upholstery may be cloth, leather, faux leather, or any other suitable material. The upholstery may be stitched in panels around the frame. The padding may be between the cover and the frame and may be foam or any other suitable material.

The seat bottom 36 can include a frame and a covering. The frame may include tubes, beams, etc. Specifically, the frame may include a pair of frame members, e.g., elongated along the longitudinal axis A2. The frame members are spaced from each other along the lateral axis A1. The frame may include cross-members extending between the frame members. The cross-members may be elongated along the lateral axis A1. The frame can include a seat pan. The seat pan may be generally planar and extend from one of the frame members to the other of the frame members, e.g., along the lateral axis A1. The seat pan may be fixed to the frame members. The frame, including the frame members, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the upholstery and the frame. The padding may be foam or any other suitable material. The seatback 34 is supported by the seat bottom 36 at a rear of the seat bottom 36. The seat bottom 36 extends forward from the seatback 34. The seatback 34 is movable relative to the seat bottom 36. For example, the seatback 34 may pivot about an axis that is parallel to the longitudinal axis A2.

The vehicle 12 includes the first airbag 16 and the second airbag 18 for controlling kinematics of an occupant of the vehicle 12. Each of the airbags 16, 18 is inflatable from an uninflated position, shown in FIG. 1, to an inflated position, shown in FIG. 2. The airbags 16, 18 may each include panels of a woven polymer, or any other suitable material, that define inflation chamber 22s that can receive inflation medium to inflate the first airbag 16 and the second airbag 18 to the inflated positions. As one example, the first airbag 16 and the second airbag 18 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 16 and the second airbag 18 are supported by the seat 14. The first airbag 16 and the second airbag 18 may be supported by the seatback 34 of the seat 14. The first airbag 16 and the second airbag 18 may be fixed to frame of the seatback 34, e.g., fixed to the pair of upright frame members via fasteners or other suitable structure. The first airbag 16 and the second airbag 18 may be supported via airbag housings, e.g., fixed to the frame of the seatback 34. The first airbag 16 and the second airbag 18 in the uninflated positions may be internal of the seat 14, e.g., under the covering of the seatback 34. The second airbag 18 may be vehicle-inboard of the first airbag 16. The second airbag 18 may be between the first airbag 16 and the second seat 32 along the lateral axis.

The inflator 30 provides inflation medium, e.g., to inflate the first airbag 16 and/or the second airbag 18 from the uninflated positions to the inflated positions. The inflator 30 may be, for example, a pyrotechnic inflator that uses a chemical reaction to drive inflation medium to the first airbag 16 and/or the second airbag 18. The inflator 30 may be of any suitable type, for example, a cold-gas inflator.

The inflator 30 is supported by the seat 14. The inflator 30 may be supported by the seatback 34 of the seat 14. The inflator 30 may be fixed to frame of the seatback 34, e.g., fixed to the pair of upright frame members via fasteners or other suitable structure. The inflator 30 may be fixed to another component supported by the seat 14, e.g., to the manifold 20.

The inflator 30 is operatively coupled to the manifold 20 to provide fluid, such as inflation medium, to the chamber 22 of the manifold 20. For example, the inflator 30 may be fixed to the manifold 20 and provide inflation medium directly to the chamber 22. As another example, the inflator 30 may be connected to the manifold 20 via fill tube or other suitable structure that directs inflation medium from the inflator 30 to the chamber 22 of the manifold 20.

The vehicle 12 may include additional airbags (not shown). For example, the vehicle 12 may include one or more airbags supported by the second seat 32, by an instrument panel of the vehicle 12, by a steering wheel of the vehicle 12, by a pillar of the body of the vehicle 12, or any other suitable structure of the vehicle 12. The vehicle 12 may include additional manifolds, inflators, etc., to provide inflation medium to the additional airbags (not shown), e.g., supported by the second seat 32 and as described herein.

The manifold 20 is included in the assembly 10 to receive inflation medium from the inflator 30 and to provide the inflation medium to the first airbag 16 and/or the second airbag 18. The manifold 20 is supported by the seat 14. The manifold 20 may be supported by the seatback 34 of the seat 14. The manifold 20 may be fixed to frame of the seatback 34, e.g., fixed to the pair of upright frame members via fasteners or other suitable structure. The manifold 20 may be metal, a fiber laminate, or any other suitable material.

The manifold 20 defines the chamber 22 to receive and provide the inflation medium. The manifold 20 encloses the chamber 22. The chamber 22 may store inflation medium from the inflator 30 under pressure. The chamber 22 may be of sufficient volume such that generally inflation medium under constant pressure can be provided to the first airbag 16 and/or second airbag 18. The manifold 20 may be a pressure vessel that stores a sufficient volume of fluid at sufficient pressure to fully inflate the first airbag 16 and the second airbag 18 to the inflated positions. The volume of the chamber 22 may be based on a sum of the volumes of the airbags 16, 18 in the inflated positions and an amount of pressure that is sufficient to cause inflation of the airbags 16, 18 within a certain amount of time. The chamber 22 defines a cross-sectional area that is greater than a cross-sectional area defined by the first fluid outlet 24. In other words, the cross-sectional area of the first fluid outlet 24 is less than the cross-sectional area of the chamber 22. The cross-sectional area of the first fluid outlet 24 extends perpendicular to a flow direction of fluid through the first fluid outlet 24. The cross-sectional area of the chamber 22 extends perpendicular to a flow direction of fluid through the chamber 22.

The manifold 20 includes a plurality of fluid outlets 24, 26, 28, e.g., the first fluid outlet 24, the second fluid outlet 26, and an exhaust fluid outlet 28, for directing fluid flow out of the chamber 22. The fluid outlets 24, 26, 28 provide passages that direct the flow of fluid. The fluid outlets 24, 26, 28 may be open to the chamber 22 on one end and open to external of the chamber 22 on an opposite end. The first fluid outlet 24 may be operatively coupled to the first airbag 16 to provide fluid from the chamber 22 the first airbag 16. The second fluid outlet 26 may be operatively coupled to the second airbag 18 to provide fluid from the chamber 22 to the second airbag 18. For example, a fill tube 38 may connect the first fluid outlet 24 to the first airbag 16 and may connect the second fluid outlet 26 to the second airbag 18. The exhaust fluid outlet 28 enables fluid in the chamber 22 to be depressurized, e.g., the pressurized fluid may be exhausted from the chamber 22 without such fluid being directed to any airbag. For example, one end of the exhaust fluid outlet 28 may be open to the chamber 22 and an opposite end may be open to external of the chamber 22 and not operatively coupled to any airbag. The exhaust fluid outlet 28 may exhaust fluid, e.g., generally into to the passenger cabin.

Figure 3:
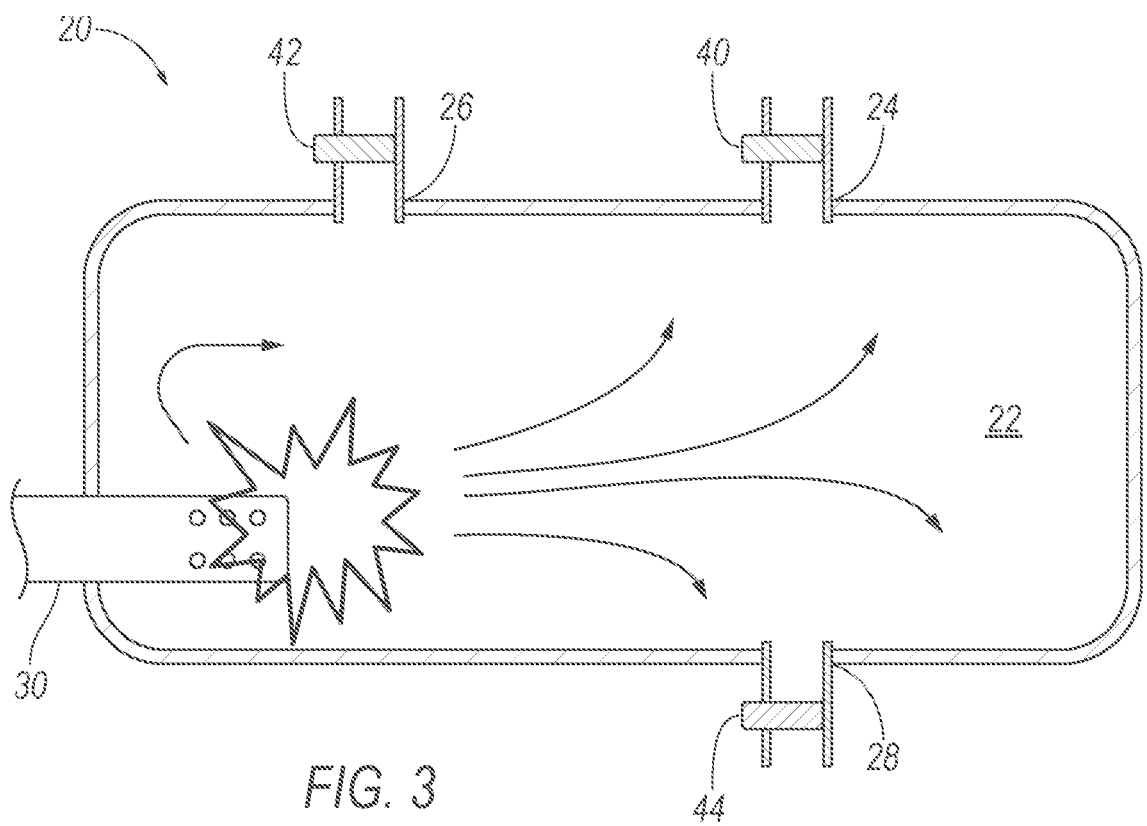
FIG. 3 is a diagrammatic view of a manifold with valves at closed positions.
Figure 4:
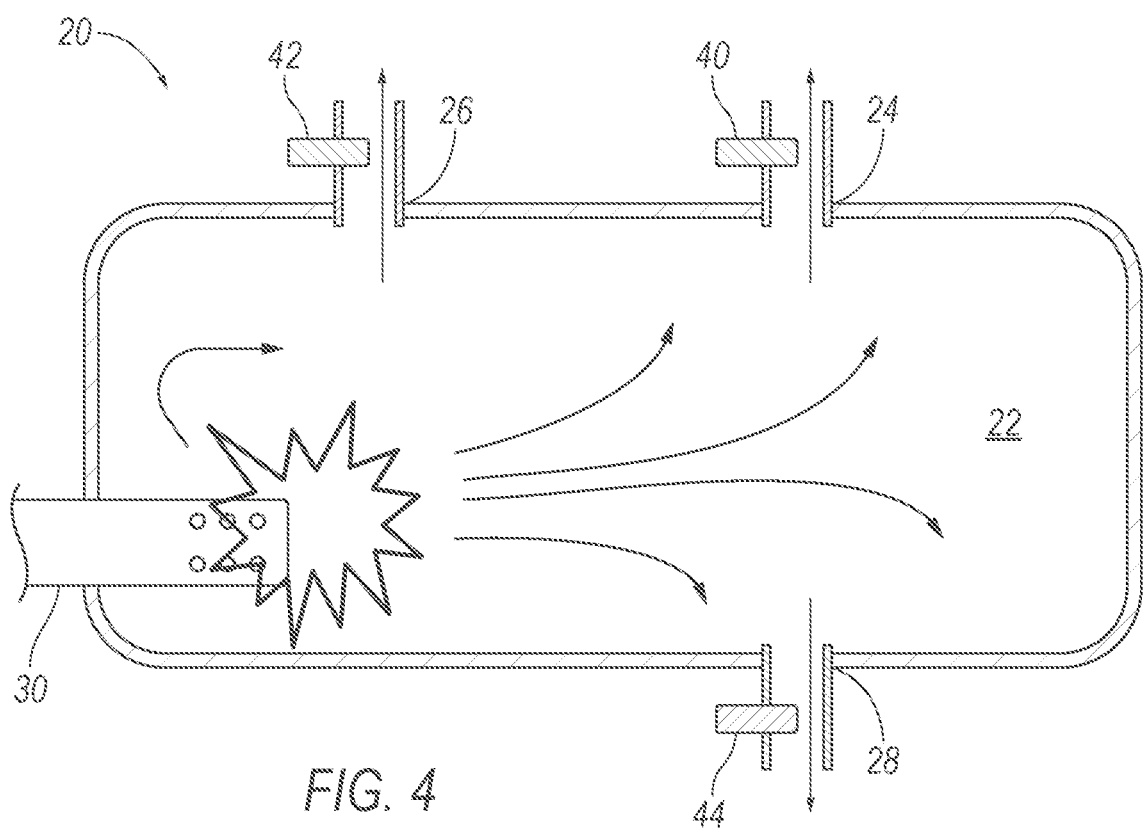
FIG. 4 is a diagrammatic view of the manifold with the valves at open positions.

With reference to FIGS. 3 and 4, one or more valves, e.g., a first valve 40, a second valve 42, and an exhaust valve 44, may be included for selectively permitting and inhibiting fluid flow through the fluid outlets 24, 26, 28. Each valve 40, 42, 44 is movable to a closed position that inhibits fluid flow, e.g., as shown in FIG. 3. Each valve 40, 42, 44 is movable to an open position that permits fluid flow, e.g., as shown in FIG. 4. The valves 40, 42, 44 may be, for example, ball valves, butterfly valves, gate valves, or other suitable valve structure that selectively permits and inhibits fluid flow, including in some examples those that are conventionally known. The valves 40, 42, 44 may move from the closed position to the open position, or vice versa, in response to a command from a computer 46. Each valve 40, 42, 44 may include an electromagnetic solenoid, a motor, and/or other suitable structure, including in some examples those that are conventionally known, for moving the respective valve from the closed position to the open position, or vice versa, in response to a command from the computer 46.

The first valve 40 may be connected at the first fluid outlet 24. The first valve 40 at the open position may permit fluid flow through the first fluid outlet 24 from the chamber 22 to the fill tube 38 operatively coupling the first fluid outlet 24 to the first airbag 16. The first valve 40 at the closed position may inhibit fluid flow through the first fluid outlet 24 from the chamber 22 to the fill tube 38 operatively coupling the first fluid outlet 24 to the first airbag 16.

The second valve 42 may be connected at the second fluid outlet 26. The second valve 42 at the open position may permit fluid flow through the second fluid outlet 26 from the chamber 22 to the fill tube 38 operatively coupling the second fluid outlet 26 to the second airbag 18. The second valve 42 at the closed position may inhibit fluid flow through the second fluid outlet 26 from the chamber 22 to the fill tube 38 operatively coupling the second fluid outlet 26 to the second airbag 18.

The exhaust valve 44 may be connected at the exhaust fluid outlet 28. The exhaust valve 44 at the open position may permit fluid flow out of the chamber 22 through the exhaust fluid outlet 28. The exhaust valve 44 at the closed position may inhibit fluid flow out of the chamber 22 through the exhaust fluid outlet 28.

Figure 5:
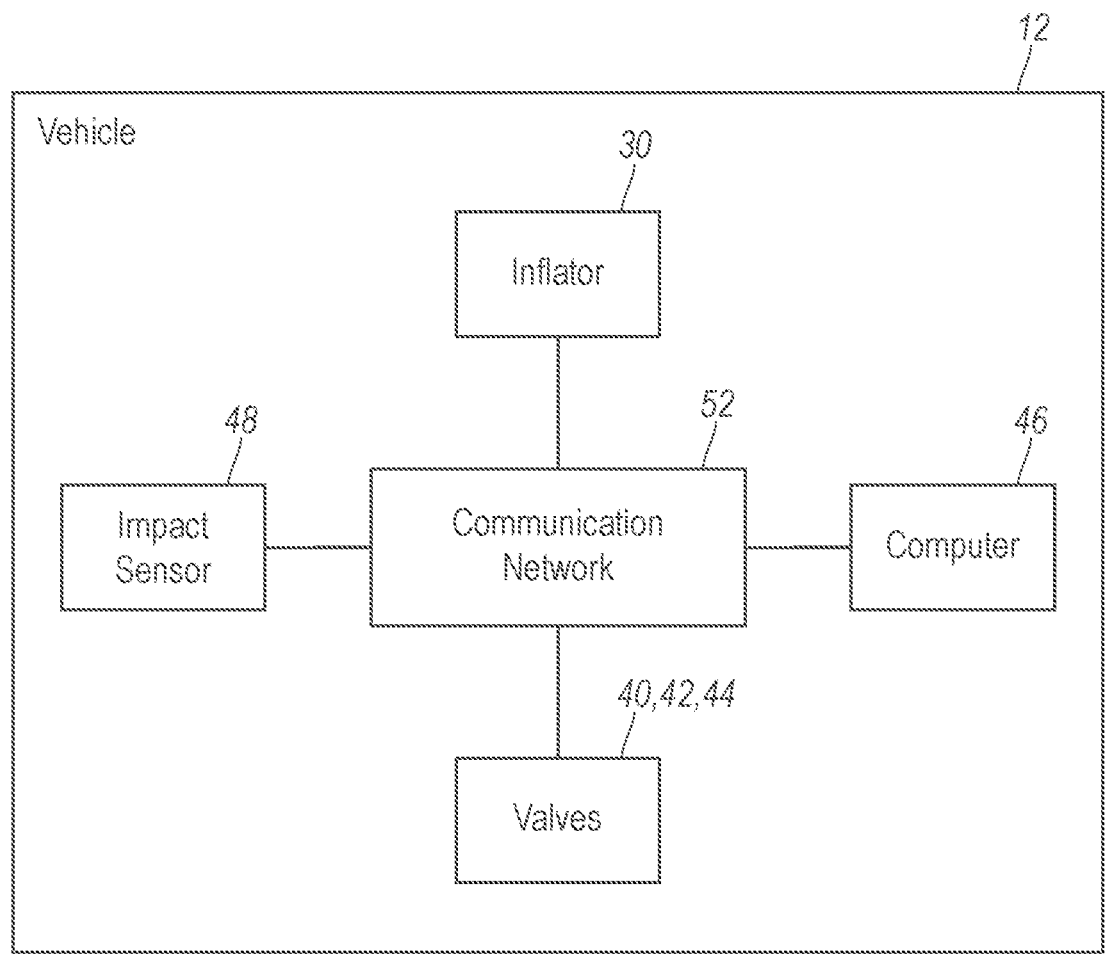
FIG. 5 is a block diagram of components of the vehicle.

With reference to FIG. 5, the vehicle 12 may include at least one impact sensor 48. The impact sensor 48 is configured to detect certain vehicle impacts. A "certain vehicle impact" is an impact of the type and/or magnitude for which inflation of the first airbag 16 is designed i.e., "certain" indicates the type and/or magnitude of the impact. The type and/or magnitude of such "certain vehicle impacts" may be pre-stored in the computer 46, e.g., in a restraints control module and/or a body control module. The impact sensor 48 may be configured to detect a certain impact contemporaneously with the certain impact and/or the impact sensor 48 may be configured to sense certain impacts prior to impact, i.e., pre-impact sensing. The impact sensor 48 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensors 48 may be located at numerous points in or on the vehicle 12.

The vehicle 12 may include one or more occupancy sensors 50 that detect occupants of the seats 14, 32. The occupancy sensors 50 may detect whether or not the seat 14 and/or the second seat 32 are occupied, i.e., whether occupants are seated in the seat 14 and/or the second seat 32. The occupancy sensors 50 may detect a size of the occupant of the seat 14 and/or the second seat 32, e.g., a weight, a height, etc. The occupancy sensors 50 may include, for example, visible-light or infrared cameras directed at the seat 14, weight sensors supported by the seat bottom 36, or other suitable structure, including in some examples those that are conventionally known.

The vehicle 12 may include a communication network 52. The communication network 52 includes hardware, such as a communication bus, for facilitating communication among components of the vehicle 12, e.g., the inflator 30, the valves 40, 42, 44, the computer 46, the impact sensors 48, the occupancy sensors 50, etc. The communication network 52 may facilitate wired or wireless communication among the components in accordance with a number of communication protocols such as controller area network (CAN), Ethernet, WiFi, Local Interconnect Network (LIN), and/or other wired or wireless mechanisms. Alternatively or additionally, in cases where the computer 46 comprises a plurality of devices, the communication network 52 may be used for communications between devices represented as the computer 46 in this disclosure.

The computer 46 may be, for example, a restraints control module of the vehicle 12. The computer 46 includes a processor, a memory, etc. The memory of the computer 46 may include memory for storing programming instructions executable by the processor as well as for electronically storing data and/or databases. The computer 46 may be a microprocessor-based computer implemented via circuits, chips, or other electronic components. For example, the computer 46 can be a generic computer 46 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 46 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 46. The memory can be of any type, e.g., hard disk drives, solid state drives, servers, or any volatile or non-volatile media. The memory can store the collected data sent from the sensors.

The computer 46 is programmed to, i.e., the memory stores instructions executable by the processor to, detect one or more certain impacts to the vehicle 12. The computer 46 may detect one or more certain impacts based on information received, e.g., via the communication network 52, from the impact sensors 48. The information received from the impact sensors 48 may indicate, e.g., a location of impact, angle of impact, amount of force of impact, acceleration of the vehicle 12, etc.

The computer 46 is programmed to determine whether the seat 14 and/or the second seat 32 are occupied. The computer 46 may determine whether the seat 14 and/or the second seat 32 are occupied based on information received, e.g., via the communication network 52, from one or more of the occupancy sensors 50. The information received from the occupancy sensors 50 may indicate, e.g., the seat 14 is occupied and/or that the second seat 32 is occupied.

The computer 46 is programmed to determine whether an occupant of the seat 14 is above a size threshold. The computer 46 may determine whether the occupant of the seat 14 is above the size threshold by comparing an identified size of the occupant with the size threshold. The size of the occupant may be, e.g., a weight, a height, etc., of the occupant. The computer 46 may identify the size of the occupant based on information received, e.g., via the communication network 52, from one or more of the occupancy sensors 50. The information received from the occupancy sensors 50 may indicate, e.g., a weight of the occupant of the seat 14, a height of the occupant of the seat 14, etc. The threshold size may be empirically determined and/or calculated, e.g., based on crash test data, computer modeling, etc.

The computer 46 may be programmed to command actuation of the inflator 30 to provide inflation medium to the manifold 20. The computer 46 may command actuation of the inflator 30 by transmitting a command to the inflator 30, e.g., via the communication network 52. The command may include, for example, an electrical pulse that triggers expansion of the inflation medium.

The computer 46 may be programmed to command one or more of the valves 40, 42, 44 from the closed position to the open position, and vice versa. The computer 46 may command one or more of the valves 40, 42, 44 to the open position or the closed position by transmitting one or more commands specifying the open position or the closed position to one or more of the valves 40, 42, 44. For example, the computer 46 may command the first valve 40 from the closed position to the open position by transmitting a command to the first valve 40, the command specifying the open position. As another example, the computer 46 may command the exhaust valve 44 from the open position to the closed position by transmitting a command to the exhaust valve 44, the command specifying the closed position.

The computer 46 may actuate the inflator 30 and the valves 40, 42, 44 to control inflation of the first airbag 16 and the second airbag 18, e.g., in response to detecting a certain impact to the vehicle 12. For example, the computer 46 may actuate the inflator 30 and actuate the first valve 40 and/or the second valve 42 to the open position to cause inflation medium to flow to the first airbag 16 and/or the second airbag 18.

The computer 46 may actuate the second valve 42 to the open position in response to determining the second seat 32 is occupied, e.g., to permit the second airbag 18 to control kinematics of the occupant of the second seat 32. The computer 46 may actuate one of the first valve 40 or the second valve 42 to the open position after the other to inflate one airbag 16, 18 after the other airbag 16, 18. Inflating one airbag 16, 18 after the other airbag 16, 18 may control kinematics of the occupants of the first seat 14 and the second seat 32 differently than inflating both airbags 16, 18 at a same time. The computer 46 may actuate one of the first valve 40 or the second valve 42 to the open position a threshold amount of time after the other to inflate one airbags 16, 18 after the other. The threshold amount of time may be empirically determined, and/or calculated, e.g., based on crash test data, computer modeling, etc. The threshold amount of time is greater than zero and may be, e.g., 20-50 milliseconds.

The computer 46 may be programmed command the first valve 40 and/or the second valve 42 to the closed position a certain amount time after actuating them to the open position, e.g., to control an inflation pressure of the respective airbag in the inflated position. A longer amount of time between opening and then closing the valves 40, 42 permits more inflation medium to flow into the airbag, thereby providing a relatively higher inflation pressure to the respective airbag. A shorter amount of time between opening and then closing the valves 40, 42 permits less inflation medium to flow into the airbag, thereby providing a lower inflation pressure to the respective airbag.

The computer 46 may control the timing of opening and then closing one or more of the valves 40, 42 based on a detected size of the occupant of the seat 14, e.g., by comparing the detected size of the occupant with the size threshold. In response to determining that the occupant of the seat 14 is not above the size threshold, the computer 46 may command the first valve 40 from the open position to the closed position a first amount of time after commanding the first valve 40 from the closed position to the open position. In response to determining that the occupant of the seat 14 is above the size threshold, the computer 46 may command the first valve 40 from the open position to the closed position a second amount of time after commanding the first valve 40 from the closed position to the open position. The first amount of time may be less than the second amount of time and provide a lower airbag pressure for the occupant that is not above the size threshold. The second amount of time may be greater than the first amount of time and provide a higher airbag pressure for the occupant that is above the size threshold. The first amount of time and the second amount of may be empirically determined, and/or calculated, e.g., based on crash test data, computer modeling, etc.

The computer 46 may be programmed to command the exhaust valve 44 from the closed position to the open position, e.g., to release pressurized inflation medium from the manifold 20. The computer 46 may command the exhaust valve 44 to the open position concurrent with or after commanding the first valve 40 and/or the second valve 42 from the open position to the closed position. For example, the computer 46 may wait to command the exhaust valve 44 to the open position until after the first airbag 16 and the second airbag 18 are inflated and after both the first valve 40 and the second valve 42 are commanded to the closed position.

Figure 6:
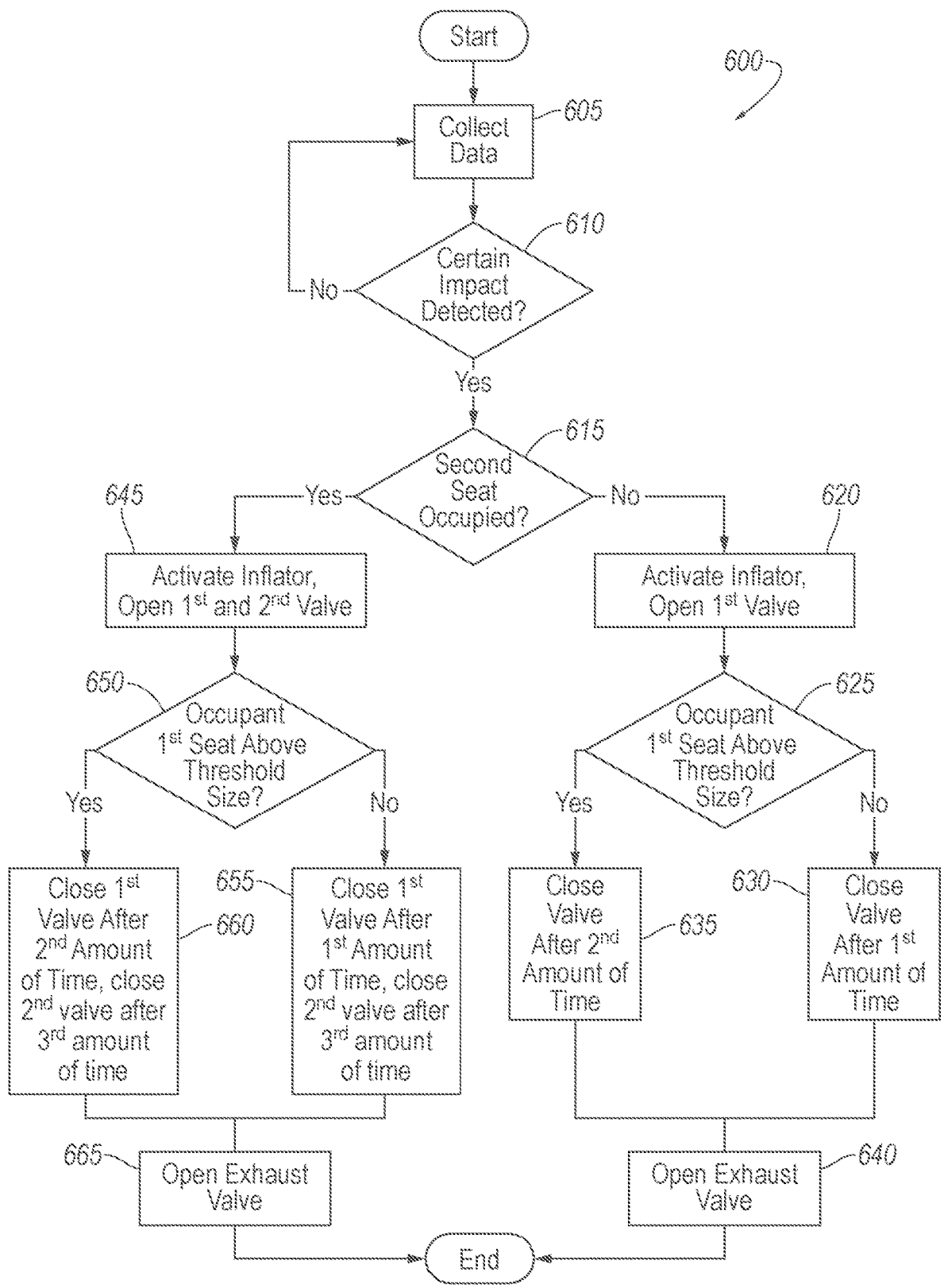
FIG. 6 is a flow chart showing a process for controlling inflation of the airbags.

FIG. 6 is a process flow diagram illustrating an exemplary process 600 for controlling the inflation of the first airbag 16 and the second airbag 18. The process 600 may be performed by the computer 46. In other words, the memory of the computer 46 may store instructions executable by the processor to perform the process 600. The process 600 begins in a block 605, in which the computer 46 collects data, e.g., received from the impact sensor 48, the occupancy sensors 50, etc., e.g., via the communication network 52. The computer 46 may continue to receive data throughout the process 600. Throughout the process 600 in the present context means substantially continuously or at time intervals, e.g., every 5 milliseconds. The computer 46 may store the collected data, as well as other determinations, detections, commands, etc., received, performed, or transmitted throughout the process 600. The valves 40, 42, 44 may all initially be at the closed position when the process 600 begins at the block 605.

At block 610, the computer 46 determines whether a certain impact to the vehicle 12 has been detected, e.g., based on information received from the impact sensor 48 via the communication network 52 and as described above. Upon determining the certain impact has been detected, the computer 46 moves to a block 615. Upon determining the certain impact has not been detected, the computer 46 returns to the block 605.

At the block 615, the computer 46 determines whether the second seat 32 is occupied, e.g., based on information received from the occupancy sensors 50 via the communication network 52 and as described herein. Upon determining that the second seat 32 is not occupied, the computer 46 moves to a block 620. Upon determining that the second seat 32 is occupied, the computer 46 moves to a block 645.

At the block 620 and in response to detecting the certain impact to the vehicle 12, the computer 46 commands actuation of the inflator 30 and commands the first valve 40 from the closed position to the open position to inflate the first airbag 16, e.g., at substantially a same time or one after the other and as described above.

At a block 625, the computer 46 determines whether the occupant of the first seat 14 is above the threshold size, e.g., based on information received from the occupancy sensors 50 via the communication network 52 and as described herein. Upon determining the occupant is not above the threshold size the computer 46 moves to a block 630. Upon determining the occupant is above the threshold size the computer 46 moves to a block 635. The computer 46 may execute the block 625 at substantially a same time as the block 620.

At the block 630 and in response to determining the occupant of the seat 14 is not above the size threshold, the computer 46 commands the first valve 40 from the open position to the closed position a first amount of time after commanding the first valve 40 from the closed position to the open position at the block 620, e.g., as described above. After the block 630 the computer 46 may move to a block 640.

At the block 635 and in response to determining the occupant of the seat 14 is above the size threshold, the computer 46 commands the first valve 40 from the open position to the closed position a second amount of time after commanding the first valve 40 from the closed position to the open position at the block 620, e.g., as described above. The second amount of time is greater than the first amount of time, e.g., to provide increased inflation pressure to the first airbag 16 to control kinematics of the occupant that is above the threshold size. After the block 635 the computer 46 may move to the block 640.

At the block 640 the computer 46 commands the exhaust valve 44 from the closed position to the open position to purge any inflation medium remaining in the manifold 20, e.g., as described above. The computer 46 may move the exhaust valve 44 to the open position concurrent with or after commanding the first valve 40 from the open position to the closed position at the block 630 or the block 635. After the block 640 the process 600 may end.

At the block 645 and in response to both determining the second seat 32 is occupied and detecting the certain impact to the vehicle 12, the computer 46 commands the first valve 40 from the closed position to the open position, commands the second valve 42 from the closed position to the open position and commands actuation of the inflator 30 to inflate the first airbag 16 and the second airbag 18, e.g., as described above. The computer 46 may actuate the inflator 30 and command the first valve 40 to the open position at substantially a same time or one after the other. The computer 46 may command the second valve 42 from the closed position to the open position the threshold amount of time, e.g., 20-50 milliseconds, after commanding the first valve 40 to the open position.

At a block 650, the computer 46 determines whether the occupant of the first seat 14 is above the threshold size, e.g., based on information received from the occupancy sensors 50 via the communication network 52 and as described herein. Upon determining the occupant is not above the threshold size the computer 46 moves to a block 655. Upon determining the occupant is above the threshold size the computer 46 moves to a block 660. The computer 46 may execute the block 650 at substantially a same time as the block 645.

At the block 655 and in response to determining the occupant of the seat 14 is not above the size threshold, the computer 46 commands the first valve 40 from the open position to the closed position the first amount of time after commanding the first valve 40 from the closed position to the open position at the block 645, e.g., as described above. Additionally, the computer 46 commands the second valve 42 to the closed position. The computer 46 may command the second valve 42 to the closed position at a certain amount of time after commanding the second valve 42 to the open position, e.g., based on a detected size of the occupant of the second seat 32. After the block 655 the computer 46 may move to a block 665.

At the block 660 and in response to determining the occupant of the seat 14 is above the size threshold, the computer 46 commands the first valve 40 from the open position to the closed position the second amount of time after commanding the first valve 40 from the closed position to the open position at the block 645, e.g., as described above. Additionally, the computer 46 commands the second valve 42 to the closed position, also as described at the block 655. After the block 660 the computer 46 may move to a block 665.

At the block 665 the computer 46 commands the exhaust valve 44 from the closed position to the open position to purge and inflation medium remaining in the manifold 20, e.g., as described above. The computer 46 may move the exhaust valve 44 to the open position concurrent with or after the latter of commanding the first valve 40 to the closed position or commanding the second valve 42 to the closed position the at the block 655 or the block 660. After the block 640 the process 600 may end.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The numerical adjectives "first," "second," etc., are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
a seat;
a first airbag supported by the seat;
a second airbag supported by the seat;
a manifold defining a chamber and including a first fluid outlet operatively coupled to the first airbag to provide fluid from the chamber to the first airbag, a second fluid outlet operatively coupled to the second airbag to provide fluid from the chamber to the second airbag, and an exhaust fluid outlet;
the exhaust fluid outlet being decoupled from the first airbag, the exhaust fluid outlet having one end open to the chamber and another end open to atmosphere around the seat; and
an inflator operatively coupled to the manifold to provide fluid to the chamber.

2. The assembly of claim 1, further comprising an exhaust valve moveable to an open position permitting fluid flow through the exhaust fluid outlet and to a closed position inhibiting fluid flow through the exhaust fluid outlet.

3. The assembly of claim 1, further comprising an exhaust valve at the exhaust fluid outlet.

4. An assembly, comprising:
a seat;
a first airbag supported by the seat;
a second airbag supported by the seat;
a manifold defining a chamber and including a first fluid outlet operatively coupled to the first airbag to provide fluid from the chamber to the first airbag, a second fluid outlet operatively coupled to the second airbag to provide fluid from the chamber to the second airbag, and an exhaust fluid outlet;
an inflator operatively coupled to the manifold to provide fluid to the chamber; and
an exhaust valve moveable to an open position permitting fluid flow through the exhaust fluid outlet and to a closed position inhibiting fluid flow through the exhaust fluid outlet,
the exhaust fluid outlet having one end open to the chamber and another end open to atmosphere around the seat.

5. The assembly of claim 4, further comprising a first valve movable to an open position permitting fluid flow through the first fluid outlet and to a closed position inhibiting fluid flow through the first fluid outlet, and a second valve movable to an open position permitting fluid flow through the second fluid outlet and to a closed position inhibiting fluid flow through the second fluid outlet.

6. The assembly of claim 5, further comprising a computer having a processor and memory storing instructions executable by the processor to, in response to detecting a certain impact, command the first valve from a closed position to an open position and command actuation of the inflator.

7. The assembly of claim 6, wherein the instructions include instructions to command the first valve from the open position to the closed position after commanding the first valve from the closed position to the open position.

8. The assembly of claim 7, wherein the instructions include instructions to command the exhaust valve from the closed position to the open position concurrent with or after commanding the first valve from the open position to the closed position.

9. The assembly of claim 6, wherein the instructions include instructions to:
determine whether an occupant of the seat is above a size threshold;
in response to determining the occupant of the seat is not above the size threshold, command the first valve from the open position to the closed position a first amount of time after commanding the first valve from the closed position to the open position; and
in response to determining the occupant of the seat is above the size threshold, command the first valve from the open position to the closed position a second amount of time after commanding the first valve from the closed position to the open position, the second amount of time being greater than the first amount of time.

10. The assembly of claim 9, wherein the instructions include instructions to command the exhaust valve from the closed position to the open position concurrent with, or after, commanding the first valve from the open position to the closed position.

11. The assembly of claim 7, further comprising a second seat, and wherein the instructions include instructions to, in response to both determining the second seat is occupied and detecting the certain impact, command the second valve from a closed position to an open position.

12. The assembly of claim 11, wherein the instructions include instructions to command the second valve from the closed position to the open position a threshold amount of time after commanding the first valve from the closed position to the open position.

13. The assembly of claim 12, wherein the threshold amount of time is 20-50 milliseconds.

14. The assembly of claim 11, wherein the instructions include instructions to command the first valve from the open position to the closed position after commanding the first valve from the closed position to the open position, and to command the second valve from the open position to the closed position after commanding the second valve from the closed position to the open position.

15. The assembly of claim 14, wherein the instructions include instructions to command the exhaust valve from a closed position to an open position concurrent with or after commanding the second valve from the open position to the closed position.

16. The assembly of claim 11, wherein the instructions include instructions to:

determine whether an occupant of the seat is above a size threshold;

in response to determining the occupant of the seat is not above the size threshold, command the first valve from the open position to the closed position a first amount of time after commanding the first valve from the closed position to the open position;

in response to determining the occupant of the seat is above the size threshold, command the first valve from the open position to the closed position a second amount of time after commanding the first valve from the closed position to the open position, the second amount of time being greater than the first amount of time; and command the second valve from the open position to the closed position.

17. The assembly of claim 16, wherein the instructions include instructions to command the exhaust valve from the closed position to the open position concurrent with or after commanding the second valve from the open position to the closed position.

18. The assembly of claim 4, wherein the chamber defines a first cross-sectional area and the first fluid outlet defines a second cross-sectional area that is less than the first cross-sectional area.

19. The assembly of claim 4, wherein the manifold and the inflator are supported by the seat.

\* \* \* \* \*